United States Patent
Eluard

(10) Patent No.: US 9,291,240 B2
(45) Date of Patent: Mar. 22, 2016

(54) DEVICE FOR SELECTIVELY CONNECTING A GEARMOTOR TO AN AIRCRAFT WHEEL TO ENABLE THE WHEEL TO BE DRIVEN SELECTIVELY BY THE GEARMOTOR

(71) Applicant: MESSIER-BUGATTI-DOWTY, Velizy-Villacoublay (FR)

(72) Inventor: Gilles Eluard, Velizy-Villacoublay (FR)

(73) Assignee: MESSIER-BUGATTI-DOWTY, Velizy-Villacoublay (FR)

( * ) Notice: Subject to any disclaimer, the term of this patent is extended or adjusted under 35 U.S.C. 154(b) by 312 days.

(21) Appl. No.: 13/712,125

(22) Filed: Dec. 12, 2012

(65) Prior Publication Data

US 2013/0167678 A1    Jul. 4, 2013

(30) Foreign Application Priority Data

Dec. 15, 2011 (FR) ...................... 11 61710

(51) Int. Cl.
| F16H 1/02 | (2006.01) |
| --- | --- |
| B64C 25/40 | (2006.01) |
| F16D 11/10 | (2006.01) |
| F16H 25/24 | (2006.01) |
| F16D 23/12 | (2006.01) |

(52) U.S. Cl.
CPC ................ F16H 1/02 (2013.01); B64C 25/405 (2013.01); F16D 11/10 (2013.01); *F16D 2023/123* (2013.01); *F16H 25/2454* (2013.01); *Y02T 50/823* (2013.01); *Y10T 74/19614* (2013.01)

(58) Field of Classification Search
CPC . B64C 25/405; F16D 11/10; F16D 2023/123; F16H 25/2454; F16H 1/02; Y02T 50/823

USPC ........... 75/89.23, 89.32, 89.33, 89.38, 89.39, 75/395, 400, 401, 405, 406; 180/247; 192/69.7, 69.8, 69.9; 244/103 S; 301/6.2, 6.5; 74/89.23, 89.32, 89.33, 74/89.38, 89.39, 395, 400, 401, 405, 406

See application file for complete search history.

(56) References Cited

U.S. PATENT DOCUMENTS

| 2,425,583 | A | 8/1947 | Volk et al. |
| --- | --- | --- | --- |
| 3,850,389 | A * | 11/1974 | Dixon ........................ 244/103 S |
| 6,484,857 | B2 * | 11/2002 | Vonnegut et al. ............... 192/35 |
| 6,805,827 | B2 * | 10/2004 | Kami et al. ................. 264/328.1 |
| 2003/0066701 | A1 | 4/2003 | Averill et al. |
| 2007/0119822 | A1 * | 5/2007 | Schmitt-Walter .......... 219/86.33 |
| 2011/0156472 | A1 | 6/2011 | Bucheton et al. |

FOREIGN PATENT DOCUMENTS

| DE | 913 969 C | 6/1954 |
| --- | --- | --- |
| FR | 2 954 752 A1 | 7/2011 |

* cited by examiner

*Primary Examiner* — William Kelleher
*Assistant Examiner* — Thomas Magnuson
(74) *Attorney, Agent, or Firm* — Sughrue Mion, PLLC

(57) ABSTRACT

A device, which connects a gearmotor to an aircraft wheel, comprising: a casing rotatably carrying a shaft driven by the gearmotor, the shaft having a fluted portion on which a gearwheel is mounted to slide along a longitudinal axis of the shaft without rotating relative to the shaft; a toothed ring for constraining to rotate with the aircraft wheel; and structure for moving the gearwheel axially between a retracted position (disengaged from the toothed ring) and an engaged position (gearwheel meshes with the toothed ring). The structure for moving the gearwheel comprises a hollow screw-and-nut assembly extending around the shaft. One element of the assembly is axially secured to the gearwheel but prevented from rotating by an anti-rotation member. The other element of the assembly is rotatably mounted inside the casing to be driven selectively by an electric motor so that rotating the electric motor causes the gearwheel to move axially.

3 Claims, 1 Drawing Sheet

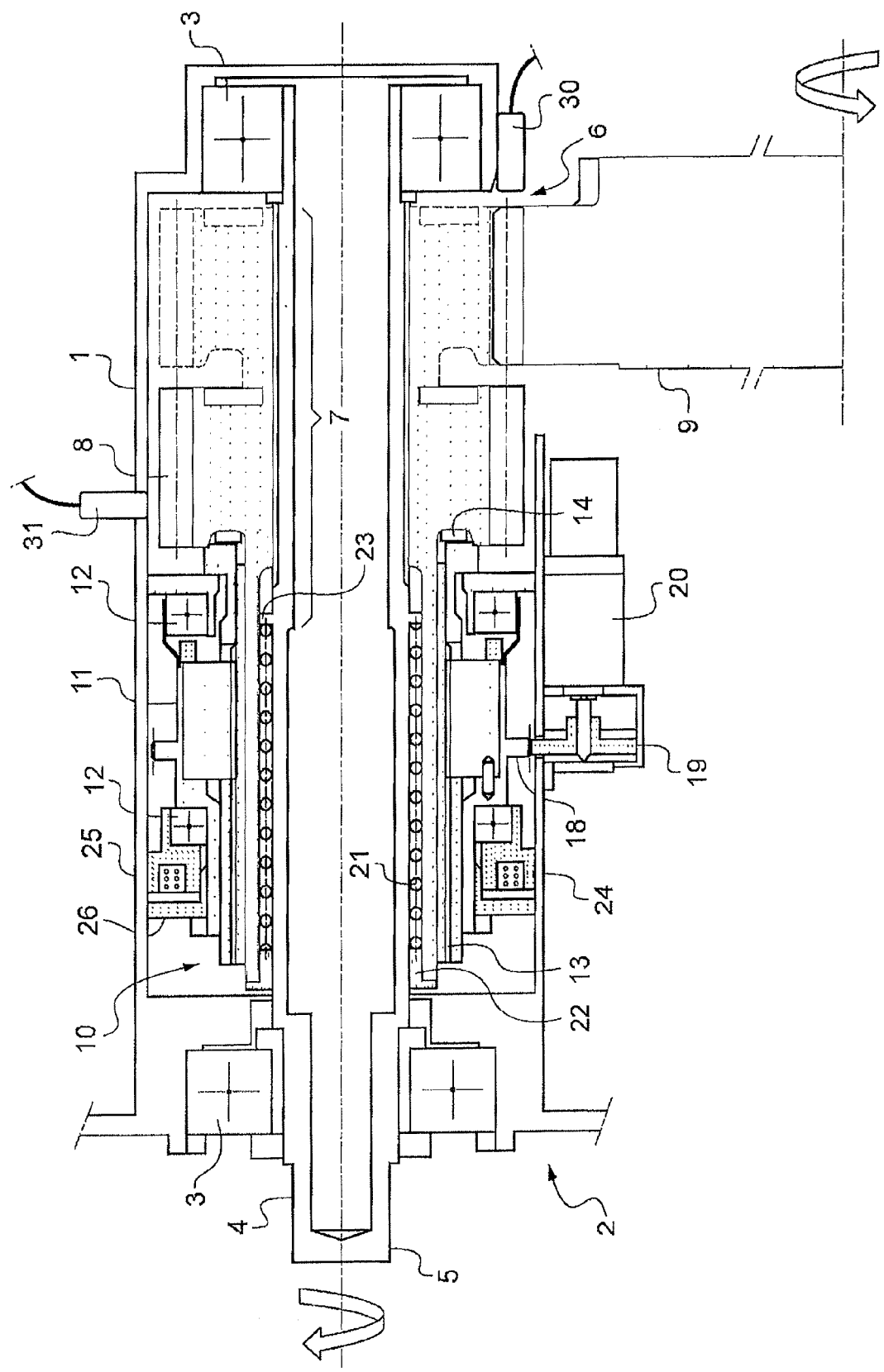

DEVICE FOR SELECTIVELY CONNECTING A GEARMOTOR TO AN AIRCRAFT WHEEL TO ENABLE THE WHEEL TO BE DRIVEN SELECTIVELY BY THE GEARMOTOR

The invention relates to a device for selectively connecting a gearmotor to an aircraft wheel to enable the wheel to be driven selectively by the gearmotor.

TECHNOLOGICAL BACKGROUND OF THE INVENTION

Document FR 2 954 752 discloses a wheel and brake assembly with a gearmotor arranged to drive the wheel in rotation. The brake has a braking actuator carrier that also carries the gearmotor. A toothed ring that is permanently engaged with the gearmotor is carried by the braking actuator carrier. A clutch member enables the toothed ring to be connected selectively with the wheel in order to enable the wheel to be driven by the gearmotor. Specifically, that member is an electromagnetic clutch, which also extends around the actuator carrier.

Although that type of device presents numerous advantages, it can sometimes be difficult to house in the crowded environment of an aircraft wheel. There therefore exists a need for a device for connecting a gearmotor to an aircraft wheel that is easier to house.

In particular, consideration has been given to constraining the toothed ring in rotation with the wheel, and to interposing a connection device between the gearmotor and the toothed ring, the connection device including a sliding gearwheel. In this respect, devices are known in which the gearwheel is slidably mounted on a shaft via fluting that allows the gearwheel to be driven in rotation by the shaft while also allowing the gearwheel to be moved axially between a retracted position in which the gearwheel is spaced apart from the ring and an engaged position in which the gearwheel meshes with the toothed ring. Movement means serve to move the gearwheel selectively from one position to another.

OBJECT OF THE INVENTION

An object of the invention is to propose a sliding gearwheel connection device for connecting a gearmotor to an aircraft wheel.

BRIEF SUMMARY OF THE INVENTION

In order to achieve this object, the invention provides a device for connecting a gearmotor to an aircraft wheel, the device comprising:
- a casing rotatably carrying a shaft that is to be driven by the gearmotor, the shaft having a fluted portion on which a gearwheel is mounted to slide along a longitudinal axis of the shaft without rotating relative to the shaft;
- a toothed ring for constraining to rotate with the aircraft wheel; and
- means for moving the gearwheel axially between a retracted position in which it is disengaged from the toothed ring and an engaged position in which the gearwheel meshes with the toothed ring.

According to the invention, the means for moving the gearwheel axially comprise a hollow screw-and-nut assembly extending around the shaft, one of the elements of the screw-and-nut assembly being axially secured to the gearwheel but prevented from rotating by an anti-rotation member, and the other element of the screw-and-nut assembly being rotatably mounted inside the casing to be driven selectively by an electric motor so that rotating the electric motor causes the gearwheel to move axially.

Thus, rotation of the electric motor drives rotation of the element of the screw-and-nut assembly that is constrained to rotate therewith, thereby causing the other element to move in translation, and thus causing the gearwheel to move in translation. The assembly is particularly compact and can be placed at the end of the gearmotor in order to drive an aircraft wheel carrying the ring.

In a particular aspect of the invention, the connection between the screw and the nut of the screw-and-nut assembly is reversible and resilient return means are installed between the shaft and the gearwheel in order to urge the gearwheel towards the retracted position.

Under such circumstances, a brake is then provided for selectively blocking rotation of the element of the screw-and-nut assembly that is driven in rotation by the electric motor.

In another particular aspect of the invention, the gearwheel and the means for moving the gearwheel axially extend between two bearings of the shaft that are carried by the casing.

BRIEF DESCRIPTION OF THE FIGURE

The invention can be better understood in the light of the following description of a particular embodiment of the invention given with reference to the sole FIGURE, which is a longitudinal section view of a device of the invention.

DETAILED DESCRIPTION OF A PARTICULAR EMBODIMENT

The device shown in FIG. 1 comprises a hollow casing 1 having a proximal face 2 suitable for being placed adjacent to a gearmotor (not shown). The casing 1 has two rolling bearings 3 that carry a shaft 4 having one end 5 projecting from the casing 1 through the proximal face 2 in order to be capable of being driven in rotation by the gearmotor, as represented by a broad curved arrow.

The casing 1 has an opening 6 facing a fluted portion 7 of the shaft 4. A movable gearwheel 8 is engaged on the fluted portion 7 to be capable of sliding between a retracted position as shown and an engagement position represented by dashed lines, in which the movable gearwheel 8 meshes with a toothed ring 9, which may for example be secured to an aircraft wheel. The fluting allows the gearwheel to move axially while ensuring that the movable gearwheel 8 is driven in rotation by the shaft 4.

The movable gearwheel 8 is moved axially by a screw-and-nut assembly 10 extending around the shaft 4. In this example, the screw-and-nut assembly 10 comprises a nut 11 mounted to rotate inside the casing 1 by means of two rolling bearings 12 and a hollow screw 13 that co-operates with the nut via a helical connection. The rotation of the nut 11 causes the screw 13 to move axially, the screw being prevented from turning by an antirotation member that is omitted from the FIGURE for greater clarity. The end of the screw 13 presses against the movable gearwheel 8 via a needle thrust bearing 14. A return spring 21 extends between a stop 22 associated with the movable gearwheel 8 and a shoulder 23 of the shaft 4 in order to urge the gearwheel towards the retracted position, thereby having the effect of pressing the movable gearwheel 8 against the needle thrust bearing 14, and thus of keeping the movable gearwheel 8 and the screw 13 axially together.

The nut 11 carries an outer wheel 18 to enable it to be driven by a gearwheel 19, itself driven by an electric motor 20 carried by the casing 1.

Thus, rotating the electric motor 20 causes the nut 11 to rotate and thus causes the screw 13 to move in translation, thereby moving the movable gearwheel 8 axially.

In this example, the connection between the nut 11 and the screw 13 is reversible. An electromagnetic brake 24 having an electromagnet 25 secured to the casing 1 and an armature constrained to rotate with the nut 11 serves to block rotation of the nut 11 selectively, thereby procuring axial blocking of the movable gearwheel 8. For safety reasons, the electromagnetic brake 24 blocks the nut 11 only if the brake is powered electrically.

It should be observed that the movable gearwheel 8 and the means for moving it extend between the bearings 3 that carry the shaft 4. The internal members of the device are thus incorporated in the casing 1 (except for the motor 20) and they are therefore very well protected.

The device of the invention operates as follows. Starting from the position shown in the FIGURE, the ring is set into rotation, e.g. while the aircraft is running on the ground after a landing. The shaft 4 is thus set into rotation by its drive motor so that the movable gearwheel 8 reaches a speed that is compatible with the speed of the toothed ring. Thereafter, the electric motor 20 is activated so as to move the movable gearwheel 8 from the retracted position to the engaged position against the return spring 21. When the movable gearwheel 8 has reached the engaged position, the electromagnetic brake 24 is powered to block the nut 11, thereby blocking the movable gearwheel 8 axially in the engaged position. The drive motor is then engaged with the wheel of the aircraft via the device of the invention.

Starting now from the engaged position, it suffices to unblock the electromagnetic brake 24. The return spring 21 causes the movable gearwheel to return towards the retracted position, given the reversibility of the screw-and-nut connection.

In order to control the operation of the device of the invention, it is advantageously provided with position sensors arranged on the casing 1 so as to collaborate selectively with a target that is constrained to move in translation with the screw 13, in order to detect the axial position in which the movable gearwheel 8 is to be found. These position sensors may also co-operate with the movable gearwheel 8 itself.

Furthermore, the device is advantageously provided with a sensor 30 facing the toothed ring 9 in order to measure its speed of rotation, and a sensor 31 placed facing the movable gearwheel 8 when it is in the retracted position, in order to measure its speed of rotation.

These speed-of-rotation sensors serve to discover the speed of rotation of the ring 9 and to cause the gearwheel 8 to be driven in rotation by the motor driving the shaft 4 until the gearwheel 8 reaches a speed of rotation compatible with that of the ring 9, thus allowing the movable gearwheel 8 to be moved axially.

The invention is not limited to the above description, but covers any variant coming within the ambit defined by the claims.

In particular, although it is specified that the connection between the screw and the nut is reversible, the device of the invention can operate with a connection that is irreversible. Nevertheless, returning the movable gearwheel to the retracted position then needs to be controlled by the electric motor 20. Under such circumstances, there is no need for a brake.

Although it is stated that the screw 13 is axially connected to the movable gearwheel 8, it would naturally be possible to link the nut 11 with the movable gearwheel 8 and use the electric motor 20 to turn the screw 11. Under such circumstances, if a brake is provided, it should act on the screw.

Although the electric motor 20 is shown as being arranged outside the casing of the device, in order to make it easier to remove, it is naturally possible to incorporate the electric motor inside the casing. In particular, it is possible to use a hollow motor extending around the shaft 4 with the rotor of the motor being connected to that one of the screw and the nut that is to be controlled by said motor.

What is claimed is:

1. A device for connecting a gearmotor to an aircraft wheel, the device comprising:
   a casing rotatably carrying a shaft that is to be driven by a gearmotor, the shaft having a fluted portion on which a gearwheel is mounted to slide along a longitudinal axis of the shaft without rotating relative to the shaft;
   a toothed ring for constraining to rotate with an aircraft wheel; and
   a structure for moving the gearwheel axially between a retracted position in which it is disengaged from the toothed ring and an engaged position in which the gearwheel meshes with the toothed ring;
   wherein the structure for moving the gearwheel axially comprise a hollow screw-and-nut assembly extending around the shaft, one of the elements of the screw-and-nut assembly being axially secured to the gearwheel but prevented from rotating by an anti-rotation member, and the other element of the screw-and-nut assembly being rotatably mounted inside the casing to be driven selectively by an electric motor so that rotating the electric motor causes the gearwheel to move axially, and
   wherein the device further includes a brake for selectively blocking rotation of the element of the screw-and-nut assembly that is driven in rotation by the electric motor.

2. The device according to claim 1, wherein the connection between the screw and the nut of the screw-and-nut assembly is reversible and resilient return means are installed between the shaft and the gearwheel in order to urge the gearwheel towards the retracted position.

3. The device according to claim 1, wherein the gearwheel and the structure for moving the gearwheel axially extend between two bearings of the shaft that are carried by the casing.

* * * * *